United States Patent
Bouvigne

(10) Patent No.: US 10,419,581 B2
(45) Date of Patent: Sep. 17, 2019

(54) DATA CAP AWARE VIDEO STREAMING CLIENT

(71) Applicant: Cisco Technology, Inc., San Jose, CA (US)

(72) Inventor: Gabriel Bouvigne, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 15/387,500

(22) Filed: Dec. 21, 2016

(65) Prior Publication Data

US 2018/0176333 A1    Jun. 21, 2018

(51) Int. Cl.
*G06F 15/16* (2006.01)
*H04L 29/08* (2006.01)
(Continued)

(52) U.S. Cl.
CPC .......... *H04L 67/327* (2013.01); *H04L 41/147* (2013.01); *H04L 43/0876* (2013.01);
(Continued)

(58) Field of Classification Search
CPC ..... H04L 5/0064; H04L 1/0002; H04L 43/16; H04L 41/5009; H04L 41/509;
(Continued)

(56) References Cited

U.S. PATENT DOCUMENTS 8,457,652 B2   6/2013  Liu et al.
9,277,289 B2   3/2016  Medford et al.
(Continued)

FOREIGN PATENT DOCUMENTS

EP    1842337 B1    10/2016
WO    2006077500 A1   7/2006

OTHER PUBLICATIONS

Hoang, L., "Android ICS: Control and Limit Data Usage without 3rd-Party Applications", posted Apr. 9, 2012, retrieved Dec. 21, 2016, 6 pages. <http://www.tech-recipes.com/rx/22583/android-ics-control-limit-data-usage/>.
Brodkin, J., "Netflix throttles video on AT&T and Verizon to keep users under data caps", Mar. 25, 2016, 4 pages. <http://arstechnica.com/business/2016/03/netflix-throttles-video-on-att-and-verizon-to-keep-users-under-data-caps/>.

*Primary Examiner* — Wing F Chan
*Assistant Examiner* — Andrew Woo
(74) *Attorney, Agent, or Firm* — Patterson + Sheridan, LLP

(57) ABSTRACT

Embodiments provide techniques for selecting a video stream for a client device. Embodiments receive a request to initiate streaming of a first video content item of a plurality of video channels. An amount of data remaining in a data plan associated with a client device is determined, as is an amount of time remaining in a current data plan cycle for the data plan associated with the client device. Embodiments calculate, for each of a plurality of available video profiles for the first video content item, an estimated amount of data usage for streaming the first video content item according to the available video profile, based on historical streaming data for the client device. An available video profile is selected for the first video content item, and embodiments facilitate streaming of the first video content item on the client device, according to the selected available video profile.

19 Claims, 10 Drawing Sheets

(51) Int. Cl.
*H04L 29/06* (2006.01)
*H04L 12/26* (2006.01)
*H04L 12/24* (2006.01)

(52) U.S. Cl.
CPC .......... *H04L 65/4084* (2013.01); *H04L 67/22* (2013.01); *H04L 67/2823* (2013.01); *H04L 67/306* (2013.01)

(58) Field of Classification Search
CPC . H04L 47/822; H04L 65/4084; H04L 65/607; H04L 65/4076; H04L 45/125; H04L 67/306; H04L 67/2823; H04L 67/2828; H04L 67/327; H04L 41/147; H04L 41/5022
USPC .................................................. 709/217, 219
See application file for complete search history.

(56) References Cited

U.S. PATENT DOCUMENTS

| | | |
|---|---|---|
| 2005/0149988 A1 | 7/2005 | Grannan |
| 2010/0226444 A1 | 9/2010 | Thevathasan et al. |
| 2014/0289371 A1* | 9/2014 | Moore .................. H04L 65/607 709/219 |
| 2015/0039601 A1* | 2/2015 | Harrang ............ G06F 17/30867 707/727 |
| 2016/0065687 A1 | 3/2016 | Velusamy et al. |
| 2017/0085616 A1* | 3/2017 | Botsford ............... H04L 65/607 |

* cited by examiner

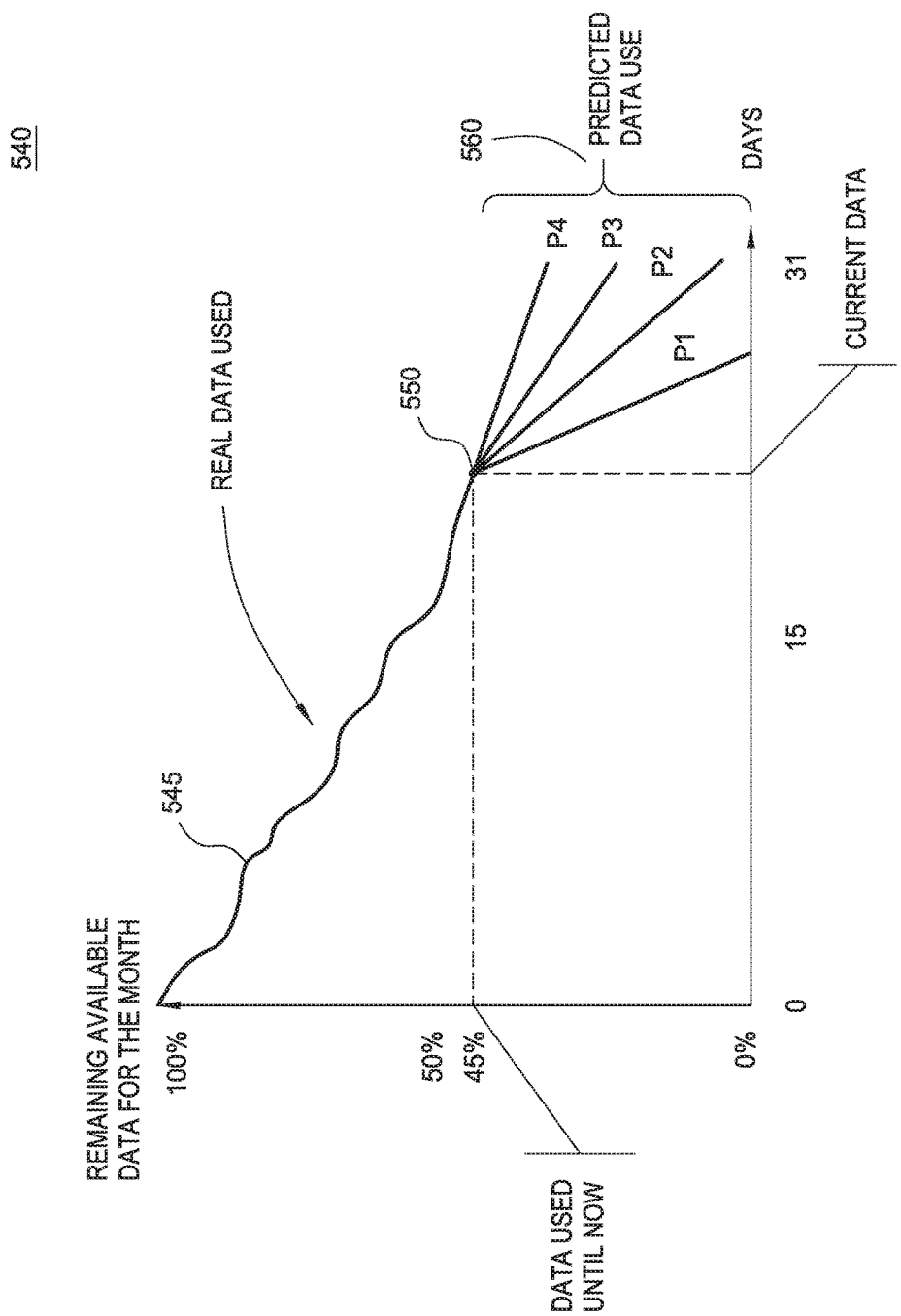

DATA CAP AWARE VIDEO STREAMING CLIENT

TECHNICAL FIELD

Embodiments presented in this disclosure generally relate to streaming content, and more specifically, embodiments disclosed herein relate to techniques for optimizing video streams within a network.

BACKGROUND

As video transmission systems have matured, digital video is more readily available via a variety of different communications systems and networks. Specifically, digital video, such as television programs, can be transmitted as multicast digital bit streams of video signals to users over networks. Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate.

In order to reduce costs and simplify the amount of effort associated with video transmission, different video compression/de-compression techniques have been developed and established. Some of the better known and more widely adopted video compression/de-compression standards include Motion Picture Experts Group 2 (MPEG-2) data streams and Motion Picture Experts Group 4 (MPEG-4) data streams. Hence, television programs are often transmitted over the network as Motion Picture Experts Group 2 (MPEG-2) data streams or Motion Picture Experts Group 4 (MPEG-4) data streams. Conventionally, for purposes of video compression/decompression, a video stream is processed one frame at a time.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box. Such a router (e.g., the user's Internet gateway) can potentially receive multiple multicast video streams at one time (e.g., one or more streams for each of a plurality of broadcast channels), and client devices (e.g., dedicated streaming devices such as the set-top box, mobile devices, tablet devices, etc.) can request specific streams to be output for display.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-C illustrate graphs that include predicted data usage for a plurality of available video profiles over a window of time, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
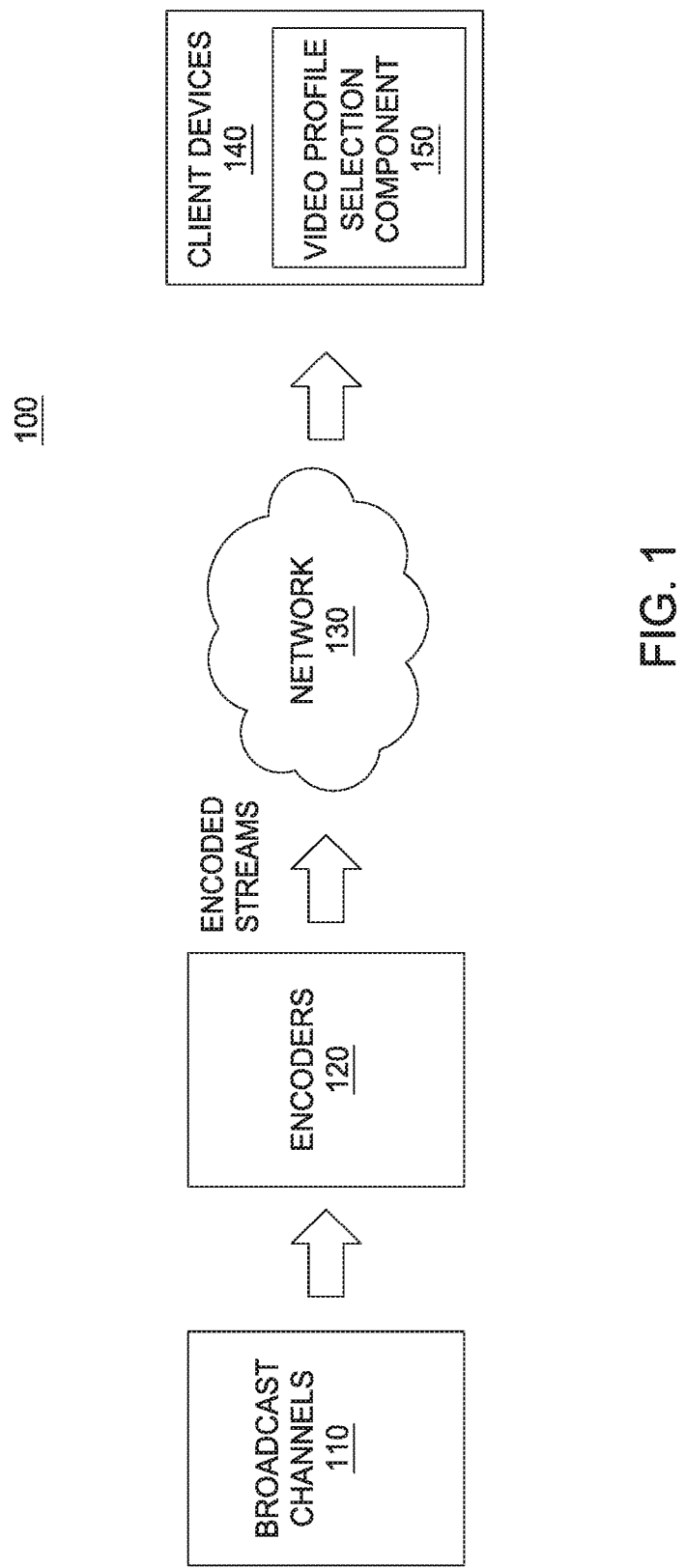
FIG. 1 illustrates a system for delivering encoded video streams to client devices configured with a video streaming profile selection component, according to one embodiment described herein.

One embodiment presented in this disclosure provides a method that includes receiving a request to initiate streaming of a first video content item of a plurality of video content items. The method includes determining an amount of data remaining in a data plan associated with a client device. The method also includes determining an amount of time remaining in a current data plan cycle for the data plan associated with the client device. Additionally, the method includes calculating, for each of a plurality of available video profiles for the first video content item, an estimated amount of data usage for streaming the first video content item according to the available video profile, based on historical streaming data for the client device. The method further includes selecting one or more of the plurality of available video profiles for the first video content item, based on the estimated amounts of data usage, the amount of data remaining in the data plan and the amount of time remaining in the current data plan cycle. The method includes facilitating streaming of the first video content item on the client device, according to a first one of the selected one or more available video profiles.

Another embodiment presented in this disclosure provides a device that includes one or more processors and logic encoded on a non-transitory medium that, when executed by operation of the one or more processors, performs an operation comprising receiving a request to initiate streaming of a first video content item of a plurality of video content items. The operation includes determining an amount of data remaining in a data plan associated with a client device. The operation also includes determining an amount of time remaining in a current data plan cycle for the data plan associated with the client device. Additionally, the operation includes calculating, for each of a plurality of available video profiles for the first video content item, an estimated amount of data usage for streaming the first video content item according to the available video profile, based on historical streaming data for the client device. The operation further includes selecting one or more of the plurality of available video profiles for the first video content item, based on the estimated amounts of data usage, the amount of data remaining in the data plan and the amount of time remaining in the current data plan cycle. The operation includes facilitating streaming of the first video content item on the client device, according to a first one of the selected one or more available video profiles.

Yet another embodiment presented in this disclosure provides a non-transitory computer-readable medium containing computer program code that, when executed by operation of one or more computer processors, performs an operation comprising receiving a request to initiate streaming of a first video content item of a plurality of content items. The operation includes determining an amount of data remaining in a data plan associated with a client device. The operation also includes determining an amount of time remaining in a current data plan cycle for the data plan associated with the client device. Additionally, the operation includes calculating, for each of a plurality of available video profiles for the first video content item, an estimated amount of data usage for streaming the first video content item according to the available video profile, based on historical streaming data for the client device. The operation further includes selecting one or more of the plurality of available video profiles for the first video content item, based on the estimated amounts of data usage, the amount of data remaining in the data plan and the amount of time remaining in the current data plan cycle. The operation includes facilitating streaming of the first video content item on the client device, according to a first one of the selected one or more available video profiles.

Example Embodiments

In many instances, content providers can provide multiple video streams (e.g., at varying bitrates) for a single video content item (e.g., a broadcast channel, video on-demand content, etc.). Generally speaking, multiple different video streams (e.g., at varying bitrates) can be provided for each of a plurality of video content items, and client devices can be configured with logic to select one of the video streams can that is optimal for the given client device. That is, it is generally preferable for a client device to display the highest quality video stream possible, and since network resources and processing capabilities can vary greatly between client devices, the optimal video stream can vary greatly between client devices. As an example, a very high bitrate encoding may be optimal for a dedicated streaming device on a high-speed network, while a relatively lower bitrate encoding may be optimal for a mobile device on a mobile network.

As such, by providing multiple encodings at varying bitrates for each video content item, content providers can better ensure that client devices can retrieve a stream that is close to optimal for the particular client device.

Modern cellular networks (e.g., an LTE network, a 4G network, etc.) are constantly improving, offering faster speeds than ever before. However, while transmissions speeds have generally increased, many network providers have in turn decreased data caps, thereby making it easier than ever for users to exceed their data caps and incur additional fees. Moreover, streaming content (e.g., video content) has become increasingly available, with on-demand content, broadcast television and live events all available for consumption. While this has made it easier for users to consume such content at any time and location, streaming such content on a cellular network frequently leads to exceeding a data cap and incurring additional fees. While conventional solutions can restrict mobile devices to lower quality video profiles, such solutions unnecessarily restrict mobile devices that have larger data plans or that have ample data left in their monthly data cap.

As such, embodiments provide techniques for intelligently selecting an available video profile for a client device, based on the client device's data plan and data usage. One embodiment includes receiving a request to initiate streaming of a first video content item of a plurality of video content items. For example, logic on a client device could receive a user input through a provided Application Program Interface (API) of a streaming application, indicating to begin streaming the first video content item on the client device. Embodiments could determine an amount of data remaining in a data plan associated with a client device. For example, the client device could subscribe to a monthly data plan from a cellular network provider, and embodiments could determine an amount of data remaining in the monthly data plan at a current moment in time (e.g., at or around the time the request is received).

Additionally, embodiments can determine an amount of time remaining in a current data plan billing cycle for the data plan associated with the client device. For example, embodiments could determine a number of days, hours and/or seconds left in the current data plan billing cycle. According to one embodiment, logic on the client device can determine a moment in time at which the current data plan billing cycle ends, and can further determine a current moment in time. The logic could then determine the amount of time remaining in the current data plan billing cycle as the difference between the moment in time at which the current data plan billing cycle ends and the current moment in time.

Embodiments can then calculate, for each of a plurality of available video profiles for the first video content item, an estimated amount of data usage for streaming the first video content item according to the available video profile, based on historical streaming data for the client device. In doing so, embodiments can estimate a duration of a current streaming session (i.e., how long the user is likely to watch the first video content item), based on historical streaming session durations specified in the historical streaming data. For example, the logic could calculate an average duration of historical streaming sessions on the client device across all of the plurality of video content items. As another example, the logic could calculate the average duration specifically based on historical streaming sessions of the first video content item on the client device.

Embodiments can then select one or more of the plurality of available video profiles for the first video content item, based on the estimated amounts of data usage, the amount of data remaining in the data plan and the amount of time remaining in the current data plan cycle. For example, embodiments could select a highest quality available video profile whose estimated amount of data usage does not exceed the amount of data remaining in the data plan. Embodiments can then facilitate streaming of the first video content item on the client device, according to a first one of the selected one or more available video profiles, e.g., by transmitting a request to initiate streaming of the first video content item using the selected available video profile.

FIG. 1 illustrates a system for delivering encoded video streams to client devices, according to one embodiment described herein. As shown, the system 100 includes a plurality of broadcast channels 110, a plurality of encoders 120, a network 130 and a plurality of client devices 140. Generally, a master video stream is provided for each of the broadcast channels 110. Such a master video stream is typically a high resolution video stream containing video content for the corresponding broadcast channel. The encoders 120 can then process the master video streams for the broadcast channels 110 in order to produce encoded video streams. For example, three of the encoders 120 could be assigned to a particular one of the broadcast channels 110, and each of the three encoders could be configured to transcode the master video stream for the broadcast channel at a different bitrate. As an example, the three encoders could be configured to encode the master video stream for the broadcast channel at a relatively high bitrate, a relatively moderate bitrate and a relatively low bitrate.

The encoded streams could then be transmitted to the client devices 140 using the network 130. In doing so, the content provider could generate a manifest file specifying that the particular broadcast channel is available in the three different bitrates, and could transmit such a manifest file to the client devices 140 using the network 130. Each of the client devices 140 could be configured to process the manifest file and to determine which of the available bitrates is optimal for the particular client device. For example, a mobile client device could be configured to select the relatively low bitrate encoding, while a dedicated video streaming device on a high-speed network connection could be configured to select the relatively high bitrate encoding. Depending on the performance of the streaming of the selected encoding, the client devices could then dynamically adjust their selected encoding. Continuing the above example, if the mobile client device determines that data packets for the video stream are arriving well in advance of their playback time, the mobile client device could request to begin receiving data packets from the moderate bitrate encoding stream. As another example, if the dedicated streaming client device determines that packets are not arriving as quickly as expected and that buffer underrun is likely to occur, the dedicated streaming client device could request to begin receiving data packets from the moderate bitrate encoding stream.

As a general matter, each of the client devices 140 may be configured with logic to select an available video profile to download for a given broadcast channel 110, based on performance attributes of the respective client device (e.g., a measure of available network throughput for the client device). In the depicted embodiment, the client devices 140 are configured with an available video profile selection component 150. In one embodiment, the available video profile selection component 150 is configured to select an available video profile for streaming to the client device 140, based on a state of a data plan of the client device 140. For example, the available video profile selection component 150 could calculate an estimated amount of data usage for each of a plurality of available video profiles for one of the broadcast channels 110, and could select an available video profile having a highest quality whose estimated amount of data usage does not exceed an amount of data remaining in the data plan of the client device.

Figure 2:
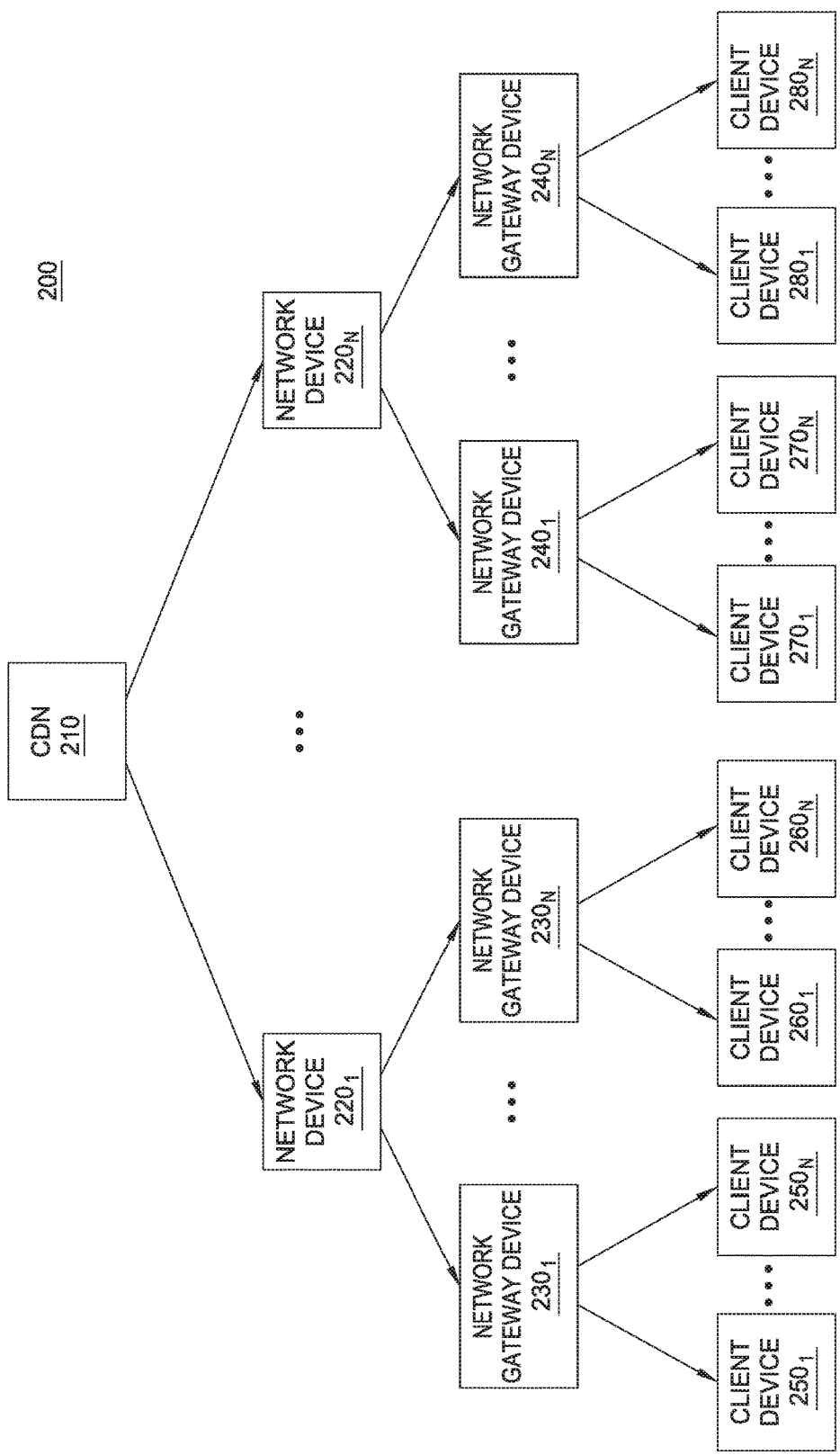
FIG. 2 illustrates a network topology for delivering encoded video streams to client devices, according to one embodiment described herein.

Generally, the encoded video streams generated by the encoders 120 can be transmitted to the client devices 140 using the network 130 in a number of different ways. One such way is through multicast communications, where particular encoded video streams are transmitted to all subscribing network devices within the network. More generally, however, any suitable technique for transmitting the data across the network 130 can be used, consistent with the present disclosure. FIG. 2 illustrates a network topology for delivering encoded video streams to client devices, according to one embodiment described herein. As shown, the network topology 200 includes a CDN 210, network devices $220_{1-N}$, network gateway devices $230_{1-N}$ and $240_{1-N}$, and client devices $250_{1-N}$, $260_{1-N}$, $270_{1-N}$, and $280_{1-N}$. In the depicted example, the network gateway devices $230_{1-N}$ and $240_{1-N}$ are configured to also serve as a router for a home network. Thus, for example, the client set-top box $240_1$ is configured to act as a router for the client device $270_{1-N}$.

In the depicted example, if the client device $270_1$ could request a particular encoded video stream for a particular broadcast channel. If the client device $270_N$ also requests the particular encoded video stream for the particular broadcast channel, the client set-top box $240_1$ can simply provide the client device $270_N$ with the data packets for the particular encoded video stream already being received due to the client device $270_1$'s request. In other words, the particular encoded video stream can be provided to the client device $270_N$ without creating an additional network connection with the CDN 210, thereby reducing the workload on the CDN 210, the network device $220_N$ and the client set-top box $240_1.m$ In some instances, the network gateway devices $230_{1-N}$ and $240_{1-N}$ are configured to subscribe to multicast transmissions for at least one video stream for each of the broadcast channels 110. In turn, the network devices $220_{1-N}$ can subscribe to multicast transmissions for the at least one video stream for each of the broadcast channels 110. While such an embodiment creates a constant flow of network traffic between the CDN 210 and the network devices $220_{1-N}$, and between the network devices $220_{1-N}$ and the network gateway devices $230_{1-N}$ and $240_{1-N}$, it enables any of the client devices $250_{1-N}$, $260_{1-N}$, $270_{1-N}$, and $280_{1-N}$ to retrieve data packets for the requested video streams from the corresponding client set-top box, using a local (and much faster) network connection. Moreover, regardless of the number of client devices $250_{1-N}$, $260_{1-N}$, $270_{1-N}$, and $280_{1-N}$, the workload on the CDN 210 remains constant, unlike conventional solutions where each of the client devices is configured to establish a separate network connection with the CDN 210 for streaming video content. As such, by transmitting the video streams through multicast transmission techniques, embodiments provide a more scalable video streaming solution relative to conventional techniques.

However, in some instances, a client device may use a data plan that has a data cap (also referred to herein as a data threshold) over a period of time. For instance, a client device may have a data plan that provides 5 GB of data each month, and any data usage over the threshold amount of data can result in the owner of the client device incurring additional fees. Thus, even though the client device may be able to retrieve a video stream at a highest bitrate available video profile, such an available video profile may not be optimal for the client device, as it may quickly exhaust the client device's data plan and potentially incur additional fees.

As such, the client devices may be configured with an available video profile selection component 150, which is generally configured to select an available video profile for the client device based at least in part on a data plan associated with the client device. For example, the available video profile selection component 150 could receive a request to initiate streaming of a first video content item of a plurality of video channels. The available video profile selection component 150 could then determine an amount of data remaining in a data plan associated with a client device and an amount of time remaining in a current data plan cycle for the data plan associated with the client device. The available video profile selection component 150 can also determine network attributes of the client device (e.g., for use in determining which available video profiles are suitable for streaming, given the current network constraints of the client device).

The available video profile selection component 150 could then calculate, for each of a plurality of available video profiles for the first video content item, an estimated amount of data usage for streaming the first video content item according to the available video profile, based on historical streaming data for the client device. The available video profile selection component 150 could select one or more of the plurality of available video profiles for the first video content item, based on the estimated amounts of data usage, the amount of data remaining in the data plan and the amount of time remaining in the current data plan cycle. The available video profile selection component 150 can then facilitate streaming of the first video content item on the client device, according to a first one of the selected one or more available video profiles. For instance, in one embodiment, the available video profile selection component 150 could transmit request, to a remote content server, specifying the selected available video profile for the first video content item.

In one embodiment, the available video profile selection component 150 is implemented on a network gateway device (e.g., a gateway device for a user's home network). In such an embodiment, the available video profile selection component 150 can facilitate the streaming of the first video content item according to the selected available video profile by generating a manifest file for the first video content item specifying the selected available video profile for the first video content item. The available video profile selection component 150 can then transmit the generated manifest file to the client device. Doing so can indirectly force the client device to use the selected available video profile, without requiring any specialized logic on the client device.

Figure 3:
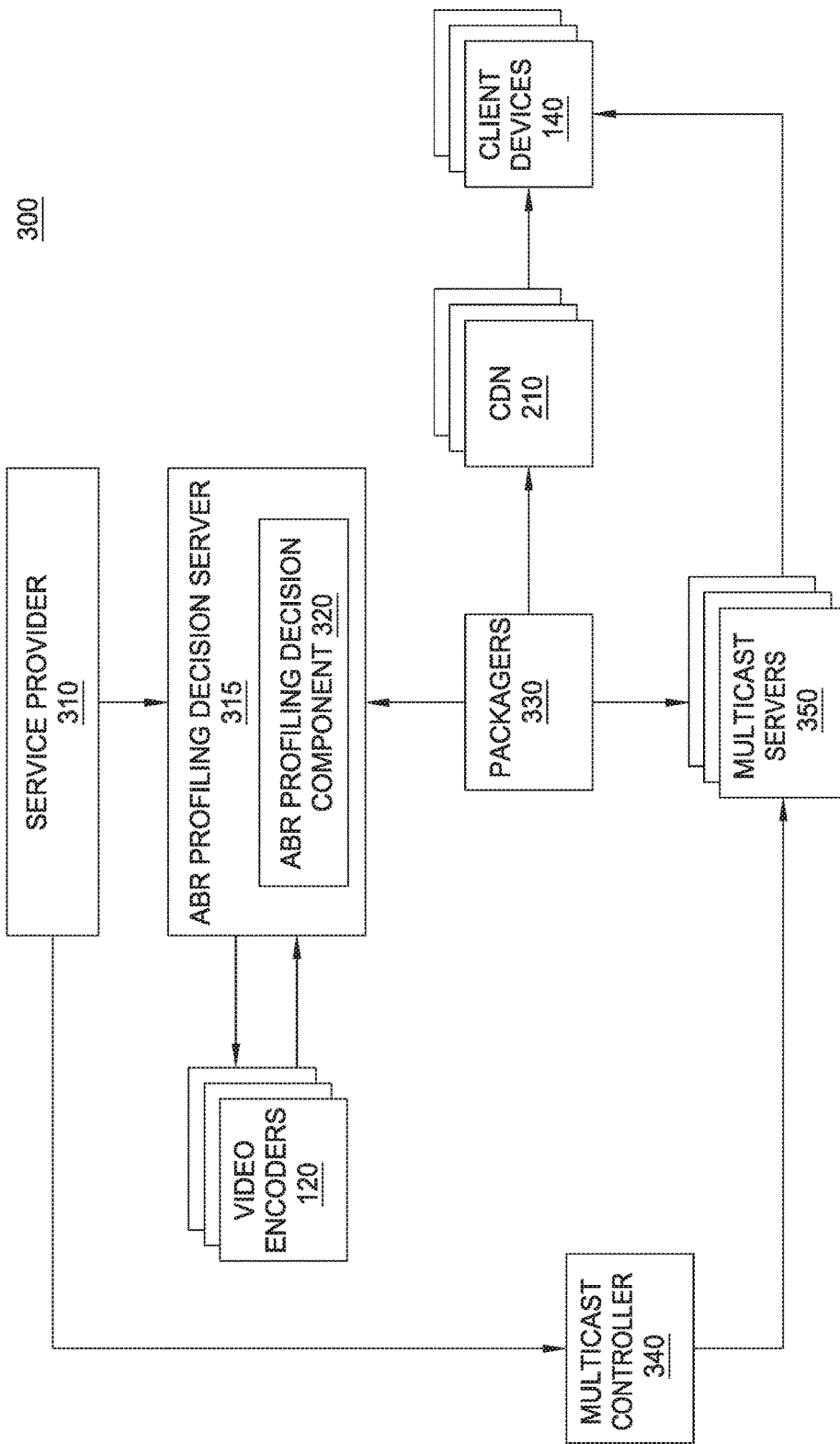
FIG. 3 illustrates a network topology for delivering encoded video streams to client devices, according to one embodiment described herein.

FIG. 3 illustrates a network topology for delivering encoded video streams to client devices, according to one embodiment described herein. As shown, the system 300 includes a service provide 310, an available video profile decision server 315, a plurality of video encoders 120, packagers 330, CDNs 210, client devices 140, a multicast controller 340 and multicast servers 350.

The video encoders 120 can then encode the master streams for their assigned broadcast channel to produce the video streams at their respective assigned bitrate. The encoded streams can then be processed by the packagers 330, which can provide the encoded video stream content to the CDN 210 and the multicast servers 350 for delivery to the client devices 140. Additionally, the packagers 330 can provide client consumption information back to the available video profile decision server 315, for use in refining the allocation of the video encoders 120 to the broadcast channels. In the depicted embodiment, the CDNs 210 can be configured to deliver the encoded video streams to particular client devices 140 using unicast transmissions, while the multicast servers 350 can be configured to deliver the encoded video streams to other client devices 140 using multicast transmissions. The client devices 140 can be configured to report back client consumption information to the available video profile decision server 315. Such consumption information can include, for example, which broadcast channels are selected, which video streams are selected, and so on. The available video profile decision server 315 could then use such information to refine the allocation of video encoders 120 to the broadcast channels.

Figure 4:
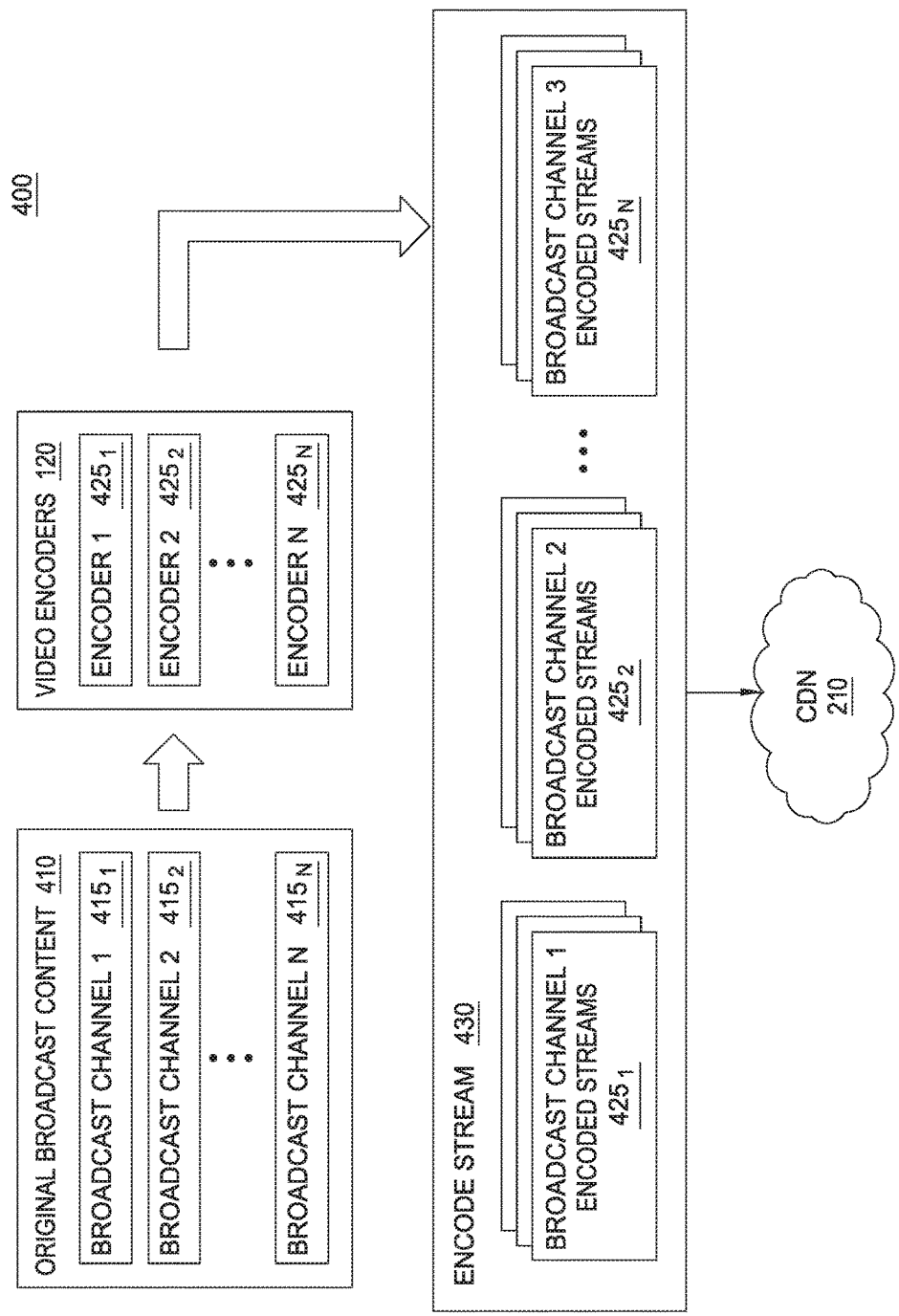
FIG. 4 illustrates a workflow for providing encoded video content for a plurality of broadcast channels, according to one embodiment described herein.

FIG. 4 illustrates a workflow for providing encoded video content for a plurality of broadcast channels, according to one embodiment described herein. As shown, the workflow 400 illustrates original broadcast content 410 (also referred to herein as master streams for broadcast channels), video encoders 120, encoded streams 430 and CDN 210. Generally, the available video profile decision server 315 can determine an optimal encoding of the video encoders 120. The encoded video streams 430 produced by the encoders $415_{1-N}$, depicted as the broadcast channel encoded streams $425_{1-N}$, can then be provided to CDN 210 for distribution to client devices. As discussed above, the CDN 210 can be configured to provide the encoded streams 430 to the client devices using various techniques (e.g., unicast communications, multicast communications, etc.). In a particular embodiment, the CDN 210 is configured to transmit requested streams to the client devices using unicast communications, and the encoded streams 430 can also be provided to a multicast server (not shown) for transmission to client devices using multicast communications.

Figure 5A:
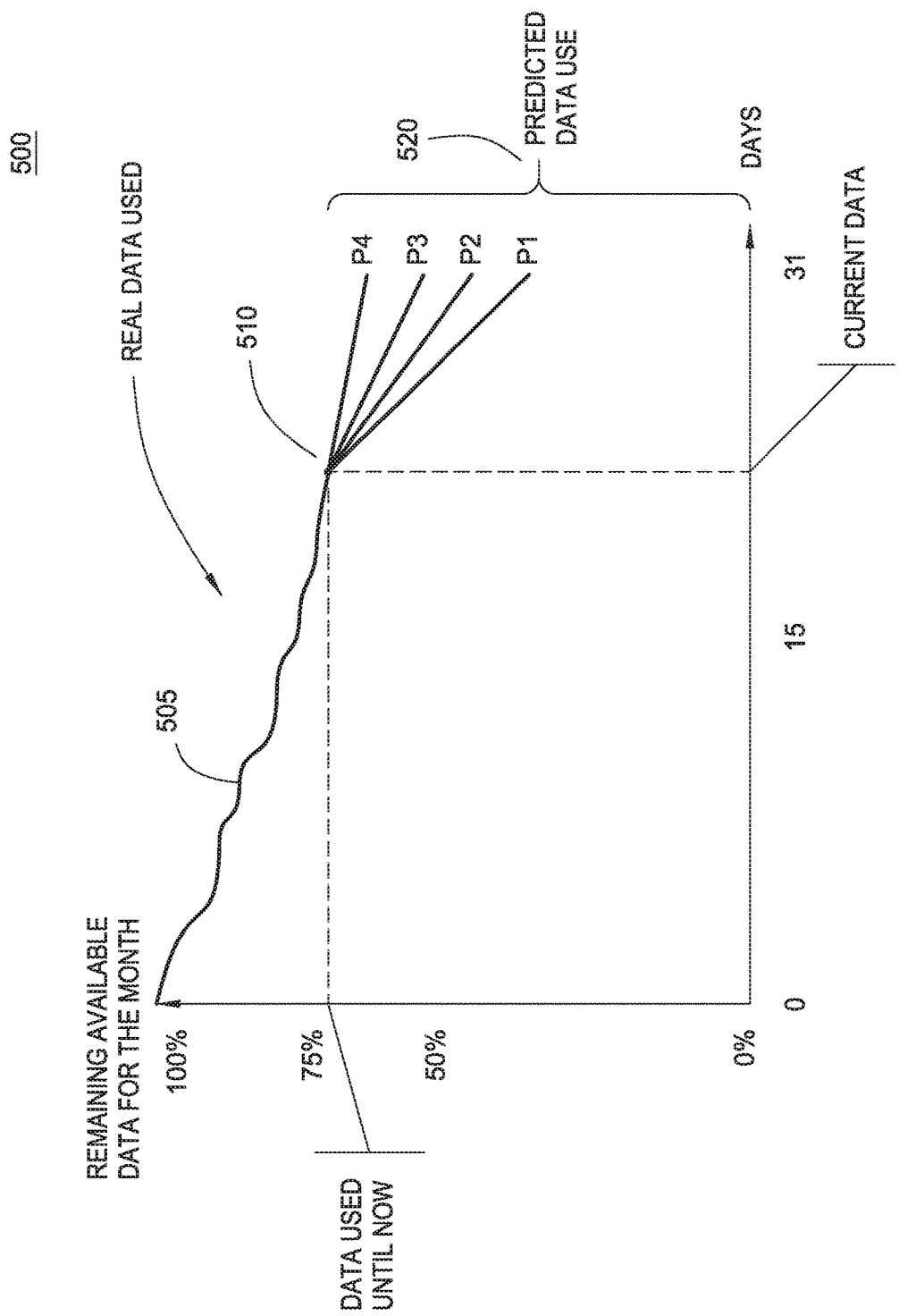
Figure 5C:
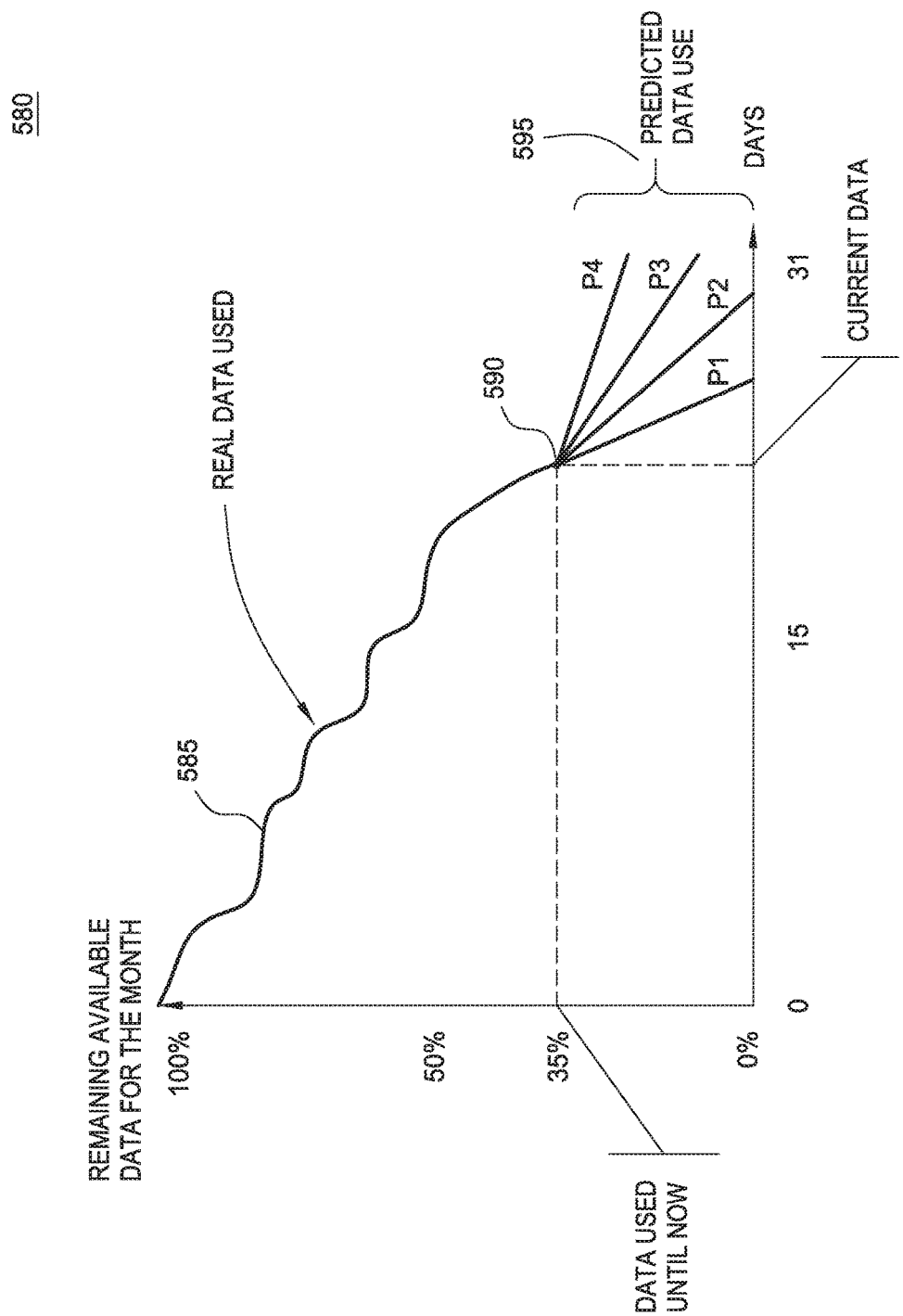

An example of dynamic available video profile selection for a client device will now be discussed with respect to FIGS. 5A-C, which illustrate graphs that include predicted data usage for a plurality of available video profiles over a window of time, according to embodiments described herein. As shown, FIG. 5A illustrates a graph 500 in which the available video profile selection component 150 has analyzed a user's historical streaming behavior on a client device and has generated a measure of predicted data usage over time 520 for each of a plurality of available video profiles and based on the client device's real data usage 505 thus far in the time period, at point 510. In the present example, the available video profile selection component 150 could determine that none of the available video profiles will exhaust the user's data threshold for the month, based on the measures of predicted data usage over time 520. In doing so, the available video profile selection component 150 can consider an estimated duration of the streaming session using each available video profile, based on historical streaming session durations on the client device. In the present example, the available video profile selection component 150 can determine that since none of the available video profiles are estimated to exhaust the user's data cap for the month, the available video profile selection component 150 could select the highest quality available video profile for the current streaming session, and could facilitate streaming of the requested video channel using the highest quality available video profile (i.e., P1 in this example). Thus, in contrast to conventional solutions which limit all mobile devices on a cellular data network to a lower quality available video profile, embodiments described herein can intelligently allow client devices to select higher quality available video profiles when their data plan permits it.

In some instances, certain available video profiles, if selected, are likely to exhaust the user's data plan, thereby causing the user to incur additional fees or be unable to use further additional data for the remainder of the data plan billing cycle. An example of such a scenario is shown in FIG. 5B, where the graph 540 includes an indication of real data usage 545 thus far in the billing cycle, at point 550. Additionally, the graph 540 includes measures of predicted data usage over time 560 that have been calculated by the available video profile selection component 150. In the depicted example, the available video profile selection component 150 can determine that if available video profile P1 were selected, the client device is estimated to exhaust its data cap within the current time period. As such, the available video profile selection component 150 could select the highest quality available video profile that is estimated not to exhaust the data cap, and could thus select available video profile P2.

Additionally, the available video profile selection component 150 can be configured to maintain a selection of an optimal available video profile in real-time (or substantially in real-time). Such an embodiment is advantageous, for instance, where the user deviates from historical viewing trends (e.g., by watching the streaming video longer than the estimated period of time). For instance, the available video profile selection component 150 can periodically re-evaluate the selection of the available video profile and can determine whether the currently selected available video profile is likely to exhaust the user's data cap. An example of this is shown in FIG. 5C, where the graph 580 indicates a measure of real data usage 585 at point 590. The available video profile selection component 150 has calculated the predicted measures of data usage over time 595. Based on the predicted measures of data usage 595, the available video profile selection component 150 could determine that available video profile P2 is no longer optimal for use in streaming the video channel, as the available video profile P2 is likely to exhaust or exceed the data remaining in the current billing cycle. As such, the available video profile selection component 150 could select the available video profile P3 as the highest quality available video profile that is not estimated to exhaust the data cap for the current billing cycle, and could facilitate streaming of the video channel according to the selected profile P3. Doing so enables the available video profile selection component 150 to adjust the quality of the video stream to the best quality allowed by the user's data cap.

According to one embodiment, the available video profile selection component 150 can analyze historical streaming data to estimate attributes of the current video streaming session. For example, such historical streaming data can include (i) a previous available video profile used for streaming video content to the client device, (ii) a duration of at least one previous streaming session on the client device, (iii) an amount of data used in the at least one previous streaming session on the client device, (iv) a historical frequency of streaming sessions on the client device, (v) a historical measure of overall data usage on the client device, and so on.

In calculating the estimated amount of data usage for streaming the first video content item according to the available video profile, for each of the plurality of available video profiles for the first video content item, the available video profile selection component 150 can calculating an estimated duration of a streaming session on the client device, based on the historical streaming data for the client device. For example, the available video profile selection component 150 could determine that, historically, when the user initiates streaming of a particular video channel, the user typically watches the video channel for 15 minutes. The available video profile selection component 150 could then calculate an estimated amount of data that will used in streaming the first video content item according to the available video profile for the estimated duration of the streaming session. For example, the available video profile selection component 150 could maintain data describing an average data usage over time, for each of the available video profiles, and the available video profile selection component 150 could determine the estimated amount of data that will be used in streaming the first video content item according to the available video profile using the average date usage over time and the estimated duration of the streaming session.

Figure 6:
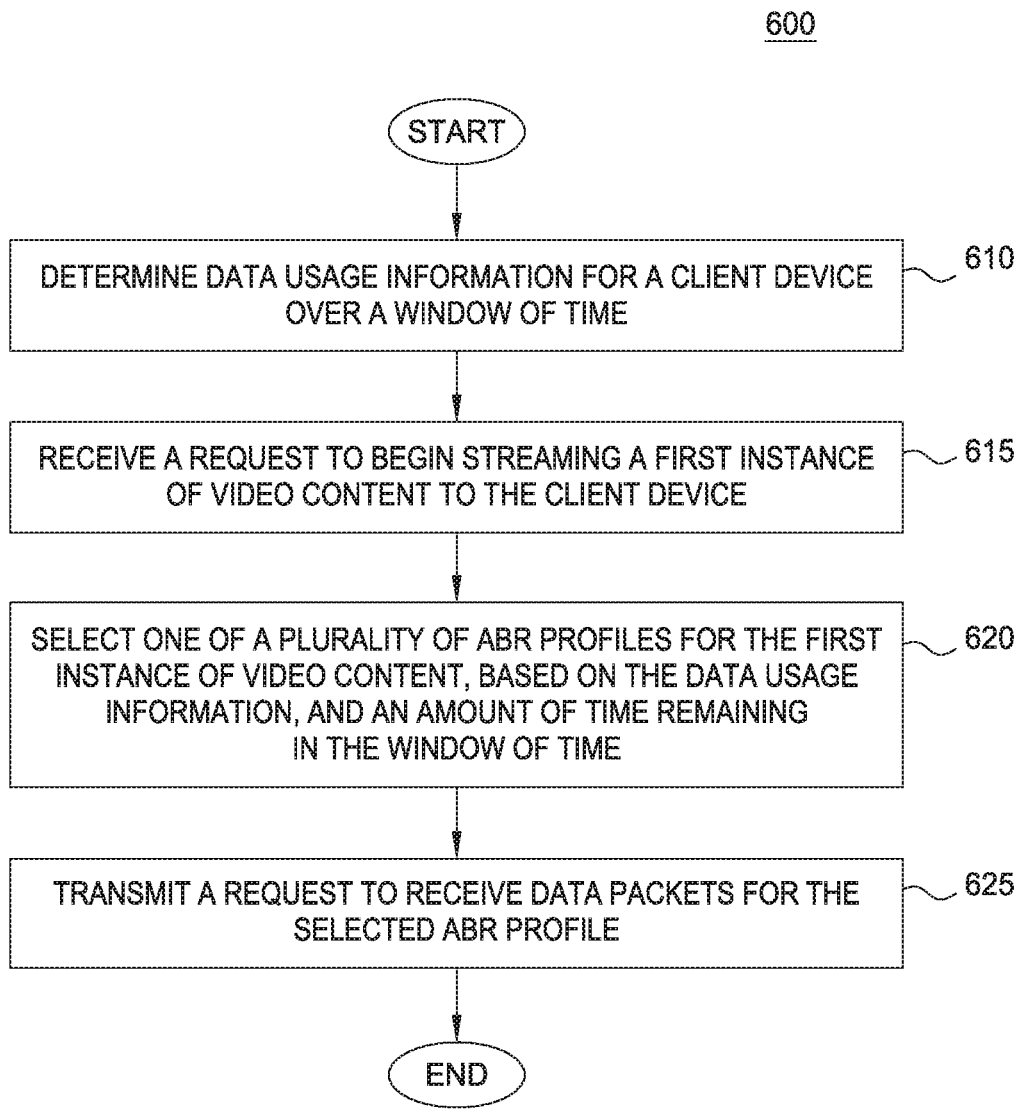
FIG. 6 is a flow diagram illustrating a method of selecting an available video profile for streaming a first instance of video content to a client device based on data usage, according to one embodiment described herein.

FIG. 6 is a flow diagram illustrating a method of selecting an available video profile for streaming a first instance of video content to a client device based on data usage, according to one embodiment described herein. As shown, the method 600 begins at block 610, where the available video profile selection component 150 determines data usage information for a client device over a window of time. For example, the available video profile selection component 150 could determine an amount of data a client device has used during a current billing cycle of a cellular device data plan. The available video profile selection component 150 receives a request to begin streaming a first instance of video content to the client device (block 615). For example, the available video profile selection component 150 could detect that a user input has been received, indicating that a particular instance of video content (e.g., a broadcast video channel, a video on-demand instance of content, etc.) has been selected within a user interface of the client device.

The available video profile selection component 150 selects one of a plurality of available video profiles for the first instance of video content, based on the data usage information and an amount of time remaining in the window of time (block 620). For example, the available video profile selection component 150 could analyze the data usage information to determine an average rate of data usage for streaming video content using the cellular network of the client device. Additionally, the available video profile selection component 150 could calculate an estimate amount of data usage for the current streaming session for the first instance of video content according to each of the plurality of available video profiles, based on the average rate of data usage and an average rate of data usage for the available video profile. The available video profile selection component 150 could then select the available video profile having the highest measure of quality whose estimated amount of data usage does not exceed the amount of data remaining in the current window of time. The available video profile selection component 150 then transmits a request to receive data packets for the selected available video profile (block 625), and the method 600 ends.

Figure 7:
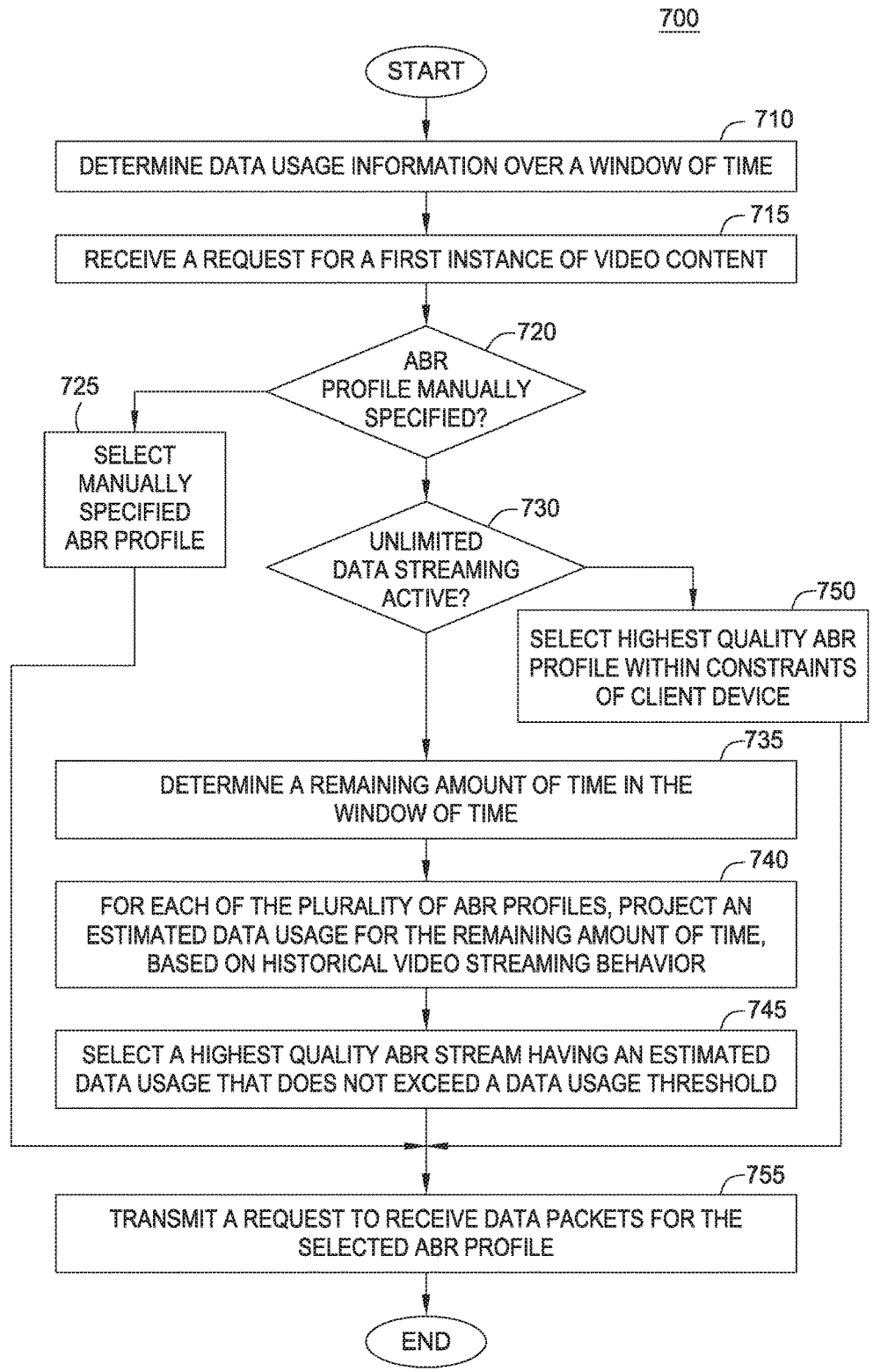
FIG. 7 is a flow diagram illustrating a method of selecting an available video profile for streaming a first instance of video content to a client device based on data usage, according to embodiments described herein.

FIG. 7 is a flow diagram illustrating a method of selecting an available video profile for streaming a first instance of video content to a client device based on data usage, according to embodiments described herein. As shown, the method 700 begins at block 710, where the available video profile selection component 150 determines data usage information over a window of time. For example, the window of time could be the current billing cycle of a client device on a mobile network.

The available video profile selection component 150 then receives a request for a first instance of video content (block 715). The first instance of video content could be, for example, a broadcast television channel, a live video feed, an on-demand video item, and so on. More generally, the instance of video content can represent any form of video content, consistent with the functionality described herein.

The available video profile selection component 150 determines whether an available video profile has been manually specified (block 720). For example, in the depicted example, the user can select a particular available video profile (e.g., 480p, 720p, 1080p, etc.) with the user interface in order to manually specify the available video profile. If so, the available video profile selection component 150 selects the manually specified available video profile (block 725), transmits a request to receive data packets for the selected available video profile (block 755) and the method 700 ends.

If no available video profile has been manually specified, the available video profile selection component 150 determines whether an unlimited data streaming mode is activated (block 730). For example, some cellular data providers may offer an unlimited data streaming mode during which client devices can use unlimited amounts of data for a fixed duration of time, typically at an additional cost. If the available video profile selection component 150 determines that such a mode is active for the client device, the available video profile selection component 150 selects the highest quality available video profile for the first instance of video content, within the constraints of the client device (block 750). For example, the available video profile selection component 150 could select a highest quality available video profile that is streamable without interruption by the current network connection of the client device. The available video profile selection component 150 then transmits a request to receive data packets for the selected available video profile (block 755) and the method 700 ends.

Upon determining that the unlimited data streaming mode is not active, the available video profile selection component 150 determines a remaining amount of time within the window of time (block 735). For example, the window of time could be a current billing cycle for data usage on the client device over a cellular network, and the available video profile selection component 150 could determine an amount of time remaining in the billing cycle based on a current moment in time.

The available video profile selection component 150 then, for each of the plurality of available video profiles available for the first instance of video content, projects an estimated data usage for streaming video content according to the available video profile for the remaining amount of time, based on historical video streaming behavior (block 740). The available video profile selection component 150 then selects a highest quality available video profile having an estimated data usage that does not exceed a data usage threshold, (block 745), e.g., the user's data cap for the current billing cycle. The available video profile selection component 150 transmits a request to receive data packets for the selected available video profile (block 755), and the method 700 ends.

Figure 8:
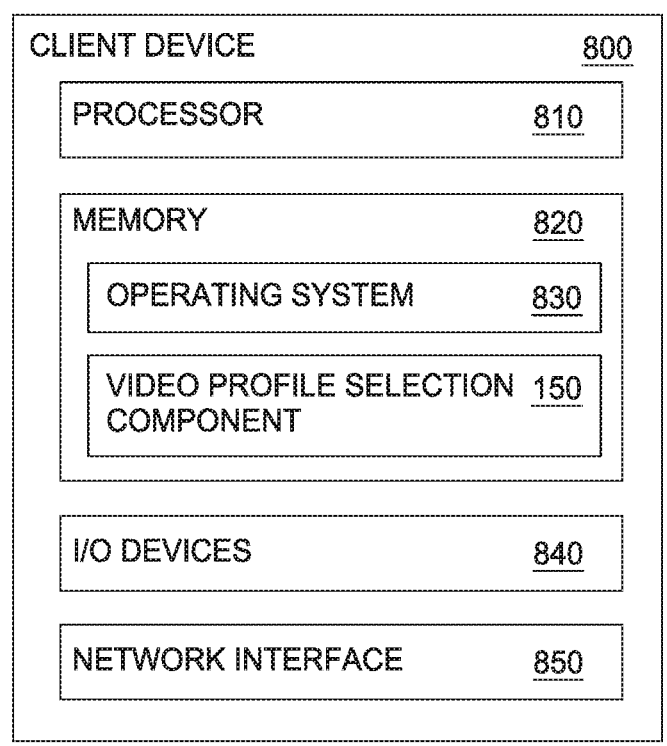
FIG. 8 illustrates a client device configured with available video profile selection logic, according to one embodiment described herein.

FIG. 8 illustrates a client device configured with available video profile selection logic, according to one embodiment described herein. As shown, the client device 800 includes, without limitation, a central processing unit (CPU) 810, a memory 820, I/O devices 840 and a network interface 850. The client device 800 may also include an I/O device interface connecting I/O devices 840 (e.g., keyboard, display and mouse devices) to the client device 800.

The CPU 810 generally retrieves and executes programming instructions stored in the memory 820. Similarly, the CPU 810 stores and retrieves application data residing in the memory 820. The client device 800 may include an interconnect, which facilitates transmission, such as of programming instructions and application data, between the CPU 810, I/O device interface, storage, network interface 850, and memory 820. The CPU 810 is representative of one or more of a single CPU, multiple CPUs, a single CPU having multiple processing cores, and the like. And the memory 820 is generally included to be representative of a random access memory.

The client device 800 may further include or otherwise be connected to storage media. Such storage may be a flash drive or a disk drive storage device. The storage may be a combination of fixed or removable storage devices, such as fixed disc drives, flash drives, removable memory cards or optical storage, network attached storage (NAS), or a storage area-network (SAN). The network interface 850 may include a wireless communication transceiver for transmitting and receiving tuned note frequencies to/from other tuning devices, if any. Further, the client device 800 is included to be representative of a physical computing system, such as a mobile phone or tablet or a tuning apparatus, as well as virtual machine instances hosted on a set of underlying physical computing systems. Further still, although shown as a single computing system, one of ordinary skill in the art will recognized that the components of the client device 800 shown in FIG. 8 may be distributed across multiple computing systems connected by a data communications network.

As shown, the memory 820 includes an operating system 830 and the video profile selection component 150. Generally, the video profile selection component 150 is configured to select an available video profile for use in streaming video content to the client device 800, based on a data plan of the client device. The video profile selection component 150 can receive a request to initiate streaming of a first video content item of a plurality of video channels. The video profile selection component 150 could further determine an amount of data remaining in a data plan associated with a client device, and an amount of time remaining in a current data plan cycle for the data plan associated with the client device. The video profile selection component 150 could then calculate, for each of a plurality of available video profiles for the first video content item, an estimated amount of data usage for streaming the first video content item according to the available video profile, based on historical streaming data for the client device, and could select one or more of the plurality of available video profiles for the first video content item, based on the estimated amounts of data usage, the amount of data remaining in the data plan and the amount of time remaining in the current data plan cycle. The video profile selection component 150 facilitate streaming of the first video content item on the client device, according to a first one of the selected one or more available video profiles.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:
1. A method, comprising:
receiving a first request to initiate streaming of a first video content item of a plurality of video content items;
receiving an amount of data used in a current data plan cycle for a data plan associated with a client device;
determining an amount of data remaining in the current data plan cycle;

determining an amount of time remaining in the current data plan cycle;

predicting, based on the amount of data used and the amount of time remaining, predicted data usage for the client device during the amount of time remaining;

calculating, for each of a plurality of available video profiles for the first video content item, an estimated amount of data usage for streaming the first video content item according to the respective available video profile, based on historical streaming data for the client device;

automatically selecting a first video profile of the plurality of available video profiles for the first video content item, based on the calculated estimated amounts of data usage, the predicted data usage, the amount of data remaining in the current data plan cycle and the amount of time remaining in the current data plan cycle;

initiating streaming of the first video content item on the client device, according to the first video profile;

identifying the first video profile associated with the first video content item, wherein the first video content item is currently streaming on the client device;

determining an updated amount of data used in the current data plan cycle associated with the client device;

automatically selecting, based on the first video profile and the updated amount of data used, a second video profile associated with the first video content item; and initiating streaming of the first video content item on the client device, according to the second video profile.

2. The method of claim 1, wherein initiating streaming of the first video content item according to the first video profile further comprises:

transmitting a second request, to a remote content server, specifying the selected first video profile for the first video content item.

3. The method of claim 1, wherein initiating streaming of the first video content item according to the first video profile further comprises:

generating a manifest file for the first video content item specifying the first video profile for the first video content item; and transmitting the generated manifest file to the client device.

4. The method of claim 1, wherein the historical streaming data specifies at least one of (i) a previously available video profile used for streaming video content to the client device, (ii) a duration of at least one previous streaming session on the client device, (iii) an amount of data used in the at least one previous streaming session on the client device, (iv) a historical frequency of streaming sessions on the client device, and (v) a historical measure of overall data usage on the client device.

5. The method of claim 4, wherein calculating, for each of the plurality of available video profiles for the first video content item, the estimated amount of data usage for streaming the first video content item according to the available video profile, further comprises:

calculating an estimated duration of a streaming session on the client device, based on the historical streaming data for the client device; and calculating an estimated amount of data that will used in streaming the first video content item according to the available video profile for the estimated duration of the streaming session.

6. The method of claim 1, wherein the data plan associated with the client device comprises a mobile device data plan that specifies a monthly data cap for the client device.

7. The method of claim 1, further comprising:

upon determining that an unlimited data streaming mode has been activated for the client device, selecting a third video profile of the plurality of available video profiles having a highest measure of quality; and initiating streaming of the first video content item on the client device, according to the third video profile.

8. The method of claim 1, wherein determining the amount of data remaining in the current data plan cycle further comprises:

transmitting a query to a provided Application Program Interface (API), requesting the amount of data remaining in the current data plan cycle.

9. The method of claim 1, wherein the first video content item comprises at least one of (i) a broadcast video channel, (ii) an instance of on-demand video content, and (iii) a live video event.

10. A device, comprising:

one or more computer processors; and logic encoded on a non-transitory medium that, when executed by operation of the one or more computer processors, performs an operation comprising:

receiving a first request to initiate streaming of a first video content item of a plurality of video channels;

receiving an amount of data used in a current data plan cycle for a data plan associated with a client device;

determining an amount of data remaining in the current data plan cycle;

determining an amount of time remaining in the current data plan cycle;

predicting, based on the amount of data used and the amount of time remaining, predicted data usage for the client device during the amount of time remaining;

calculating, for each of a plurality of available video profiles for the first video content item, an estimated amount of data usage for streaming the first video content item according to the respective available video profile, based on historical streaming data for the client device;

automatically selecting a first video profile of the plurality of available video profiles for the first video content item, based on the calculated estimated amounts of data usage, the predicted data usage, the amount of data remaining in the current data plan cycle and the amount of time remaining in the current data plan cycle;

initiating streaming of the first video content item on the client device, according to the first video profile;

identifying the first video profile associated with the first video content item, wherein the first video content item is currently streaming on the client device;

determining an updated amount of data used in the current data plan cycle associated with the client device;

automatically selecting, based on the first video profile and the updated amount of data used, a second video profile associated with the first video content item; and initiating streaming of the first video content item on the client device, according to the second video profile.

11. The device of claim 10, wherein initiating streaming of the first video content item according to the first video profile further comprises:

transmitting a second request, to a remote content server, specifying the selected first video profile for the first video content item.

12. The device of claim 10, wherein initiating streaming of the first video content item according to the first video profile further comprises:
generating a manifest file for the first video content item specifying the first video profile for the first video content item; and
transmitting the generated manifest file to the client device.

13. The device of claim 10, wherein the historical streaming data specifies at least one of (i) a previous available video profile used for streaming video content to the client device, (ii) a duration of at least one previous streaming session on the client device, (iii) an amount of data used in the at least one previous streaming session on the client device, (iv) a historical frequency of streaming sessions on the client device, and (v) a historical measure of overall data usage on the client device.

14. The device of claim 13, wherein calculating, for each of the plurality of available video profiles for the first video content item, the estimated amount of data usage for streaming the first video content item according to the available video profile, further comprises:
calculating an estimated duration of a streaming session on the client device, based on the historical streaming data for the client device; and
calculating an estimated amount of data that will used in streaming the first video content item according to the available video profile for the estimated duration of the streaming session.

15. The device of claim 10, the operation further comprising:
upon determining that an unlimited data streaming mode has been activated for the client device, selecting a third video profile of the plurality of available video profiles having a highest measure of quality; and
initiating streaming of the first video content item on the client device, according to the third video profile.

16. The device of claim 10, wherein determining the amount of data remaining in the current data plan cycle further comprises:
transmitting a query to a provided Application Program Interface (API), requesting the amount of data remaining in the current data plan cycle.

17. The device of claim 10, wherein the first video content item comprises at least one of (i) a broadcast video channel, (ii) an instance of on-demand video content, and (iii) a live video event.

18. A non-transitory computer-readable medium containing computer program code that, when executed by operation of one or more computer processors, performs an operation comprising:
receiving a first request to initiate streaming of a first video content item of a plurality of video channels;
receiving an amount of data used in a current data plan cycle for a data plan associated with a client device;
determining an amount of data remaining in the current data plan cycle;
determining an amount of time remaining in the current data plan cycle;
predicting, based on the amount of data used and the amount of time remaining, predicted data usage for the client device during the amount of time remaining;
calculating, for each of a plurality of available video profiles for the first video content item, an estimated amount of data usage for streaming the first video content item according to the respective available video profile, based on historical streaming data for the client device;
automatically selecting a first video profile of the plurality of available video profiles for the first video content item, based on the calculated estimated amounts of data usage, the predicted data usage, the amount of data remaining in the current data plan cycle and the amount of time remaining in the current data plan cycle;
initiating streaming of the first video content item on the client device, according to the first video profile;
identifying the first video profile associated with the first video content item, wherein the first video content item is currently streaming on the client device;
determining an updated amount of data used in the current data plan cycle associated with the client device;
automatically selecting, based on the first video profile and the updated amount of data used, a second video profile associated with the first video content item; and
initiating streaming of the first video content item on the client device, according to the second video profile.

19. The non-transitory computer-readable medium of claim 18, wherein the historical streaming data specifies at least one of (i) a previous available video profile used for streaming video content to the client device, (ii) a duration of at least one previous streaming session on the client device, (iii) an amount of data used in the at least one previous streaming session on the client device, (iv) a historical frequency of streaming sessions on the client device, and (v) a historical measure of overall data usage on the client device, and wherein calculating, for each of the plurality of available video profiles for the first video content item, the estimated amount of data usage for streaming the first video content item according to the available video profile, further comprises:
calculating an estimated duration of a streaming session on the client device, based on the historical streaming data for the client device; and
calculating an estimated amount of data that will used in streaming the first video content item according to the available video profile for the estimated duration of the streaming session.

* * * * *